United States Patent
Kundala et al.

(10) Patent No.: US 7,606,889 B1
(45) Date of Patent: Oct. 20, 2009

(54) METHODS AND SYSTEMS FOR COMPARING STORAGE AREA NETWORK CONFIGURATIONS

(75) Inventors: Shankar Kundala, Santa Clara, CA (US); Paul Ogren, Saint Paul, MN (US); Mark M. McBride, Santa Clara, CA (US)

(73) Assignee: EMC Corporation, Hopkinton, MA (US)

( * ) Notice: Subject to any disclaimer, the term of this patent is extended or adjusted under 35 U.S.C. 154(b) by 374 days.

(21) Appl. No.: 11/479,556

(22) Filed: Jun. 30, 2006

(51) Int. Cl.
*G06F 15/173* (2006.01)
*G06F 15/177* (2006.01)
*G06F 15/16* (2006.01)
*G06F 17/00* (2006.01)

(52) U.S. Cl. .................. 709/223; 709/220; 709/249; 715/206

(58) Field of Classification Search .................. None
See application file for complete search history.

(56) References Cited

U.S. PATENT DOCUMENTS

| 6,848,078 | B1* | 1/2005 | Birsan et al. ............. 715/206 |
| 7,171,462 | B1* | 1/2007 | Kavasseri et al. ......... 709/223 |
| 7,287,069 | B1* | 10/2007 | Kavasseri et al. ......... 709/221 |
| 2001/0054093 | A1* | 12/2001 | Iwatani ..................... 709/223 |
| 2003/0115299 | A1* | 6/2003 | Froyd et al. ............... 709/220 |
| 2003/0149756 | A1* | 8/2003 | Grieve et al. ............. 709/223 |
| 2004/0006612 | A1* | 1/2004 | Jibbe et al. ............... 709/223 |
| 2004/0088437 | A1* | 5/2004 | Stimac ...................... 709/249 |

* cited by examiner

*Primary Examiner*—Wen-Tai Lin
(74) *Attorney, Agent, or Firm*—Chapin IP Law, LLC; Barry W. Chapin, Esq.

(57) ABSTRACT

Methods and systems for comparing configurations of a storage area network are disclosed. A first configuration file and a second configuration file, each representing the configuration of a storage area network, are imported into a first configuration tree and a second configuration tree. An unordered comparison is then performed on the configuration trees. The unordered comparison produces a difference file that identifies changes in the configurations of the storage area networks. The configuration trees may be each processed into comparison trees before the unordered comparison is performed. The unordered comparison may produce two results files, one corresponding to the first comparison tree and the other corresponding to the second comparison tree; these may be combined to create the difference file. The identified changes in the difference file or in the results files may then be reported to a storage area network manager or administrator.

20 Claims, 17 Drawing Sheets

```
-<EdStorage>
<manuf>EMC</manuf>
<productId>41302</productId>
<autoGlobalSpare>true</autoGlobalSpare>
<compName>CLARiiON</compName>
<customizable>true</customizable>
<model>CX400</model>
<AccessedStorage>8</AccessedStorage>
<fanOut>32</fanOut>
<id>2489</id>
<name>Array 1</name>
<configuredDAE>0</configuredDAE>
<maxHostPorts>-1</maxHostPorts>
<DAEsForCacheCalc>0</DAEsForCacheCalc>
<autoDAE>true</autoDAE>
+<EdCardSlot></EdCardSlot>
+<EdCardSlot></EdCardSlot>
+<EdCardSlot></EdCardSlot>
+<EdDiskInventory></EdDiskInventory>
+<EdDiskInventory></EdDiskInventory>
</EdStorage>
```

FIG. 3A

```xml
-<EdSingleNodeServer>
<bootSupport>NO</bootSupport>
<compSid>95</compSid>
<name>Sever-01</name>
<compName>PowerEdge 6350</compName>
<manufsid>6</manufsid>
<manuf>Dell</manuf>
<id>6</id>
-<EdStorageRequirement>
<id>7</id>
-<EdStorageChunk>
<remoteType>None</remoteType>
<capacity>800.0</capacity>
<name>Requirement0</name>
<id>8</id>
<AccessedStorage>2489</AccessedStorage>
<raidPID>46113</raidPID>
<raid>46113</raid>
<targetStorage>NSE_CLARiiON_CX</targetStorage>
<chunkType>Primary</chunkType>
</EdStorageChunk>
</EdStorageRequirement>
+<EdHBA>
<name>HBA0</name>
<portType>1</portType>
<id>11</id>
<manufsid>25</manufsid>
<compSid>60304</compSid>
<driverlabel>2.40a2</driverlabel>
<firmwaresid>164</firmwaresid>
<compName>LP10000-E</compName>
<driversid>387</driversid>
<firmwarelabel>1.91a1</firmwarelabel>
<cardSpeed>2</cardSpeed>
<NoPort>1</NoPort>
<manuf>Emulex</manuf>
+<EdPort></EdPort>
</EdHBA>
-<EdOperatingSystem></EdOperatingSystem>
</EdSingleNodeServer>
```

FIG. 3B

```xml
<EdPhysicalFabric>
<name>Fabric1</name>
<productId>40001</productId>
<tierConnections>0</tierConnections>
<enableLogicalFabrics>false</enableLogicalFabrics>
<id>2514</id>
-<EdSwitchTier>
<minSwitch>1</minSwitch>
<name>Mesh A</name>
<id>2515</id>
<productId>50005</productId>
<compName>Full Mesh</compName>
<maxSwitch>10</maxSwitch>
<tierIndx>0</tierIndx>
-<EdSwitch>
<model>ES-3216</model>
<manuf>McDATA</manuf>
<firmware>4.01.00</firmware>
<compName>Sphereon</compName>
<isDirector>false</isDirector>
<firmwaresid>37</firmwaresid>
<id>2516</id>
<productId>20047</productId>
<name>mcDATA</name>
-<EdCardSlot>
<cardType>EdSWCard</cardType>
<id>3680</id>
<directorNumber>0</directorNumber>
+<EdSWCard></EdSWCard>
</EdCardSlot>
</EdSwitch>
+<EdSwitch></EdSwitch>
+<EdSwitch></EdSwitch>
</EdSwitchTier>
<EdLogicalFabric>
<logicalFabricID>1</logicalFabricID>
+<PortsInLogicalFabric></PortsInLogicalFabric>
<name>Fabric1</name>
<logicalFabricType>1</logicalFabricType>
<id>2556</id>
+<EdZoningData></EdZoningData>
</EdLogicalFabric>
</EdPhysicalFabric>
```

FIG. 3C

```xml
-<Bridges>
-<EdBridge>
<compSid>60371</compSid>
<name>Bridge-01</name>
<model>SNC 6101</model>
<manufsid>48</manufsid>
<manuf>ADIC (Pathlight)</manuf>
<id>592</id>
-<EdCardSlot>
<cardType>EdBridgeCard</cardType>
<directorNumber>0</directorNumber>
<id>593</id>
-<EdBridgeCard>
<cardSpeed>2</cardSpeed>
<portType>5</portType>
<name>Card0</name>
<compName>Bridge Card</compName>
<productId>-2</productId>
<manuf>Generic</manuf>
<id>594</id>
-<EdPort>
<capabilities>FC-SW</capabilities>
<name>0</name>
<portNumber>0</portNumber>
<id>595</id>
</EdPort>
-<EdPort>
<capabilities>FC-SW</capabilities>
<name>1</name>
<portNumber>1</portNumber>
<PhysicalConnection>2547</PhysicalConnection>
<id>596</id>
</EdPort>
</EdBridgeCard>
</EdCardSlot>
+<EdCardSlot></EdCardSlot>
+<EdCardSlot></EdCardSlot>
+<EdCardSlot></EdCardSlot>
</EdBridge>
</Bridges>
```

FIG. 3D

```
<createDate>Apr 13, 2005 4:53:12 PM PDT</createDate>
<version>168</version>
<XMLVersion>5</XMLVersion>
<RuleSetDate>Apr 24, 2006 3:22:52 PM PDT</RuleSetDate>
<lastUpdate>May 11, 2006 1:20:19 PM PDT</lastUpdate>
<configState>2</configState>
<RuleSetVersion>1.1</RuleSetVersion>
-<expandedMessageIds>
,,,error,info,,error,info,m9214,m9201,m6001,m8010,m6010,m9221,m4009
</expandedMessageIds>
<ProductVersion>5.3.10.228</ProductVersion>
<name>ESM_Report</name>
```

FIG. 3E

```
-<Message>
<url>5721.htm</url>
<name>5721</name>
<msg_id>5721</msg_id>
<msgtype>4</msgtype>
-<text>
According to the EMC Support Matrix 'Cluster Software' section, the following cluster
configurations are qualified only if a generic component is one of the listed
models.<table class="warning" border="1" bordercolor="#E4E4E4" cellpadding="0"
cellspacing="0" width="90%"> <tr class=mesgHeading
><td>Host</td><td>Configuration</td><td>Generic Component</td><td>Qualified
Models</td><td class="noprint">All Qualified Configurations</td></tr>
<tr valign=top><td>Pleasanton/Node0</td><td>Windows 2000 Advanced Server SP4 --
Symmetrix DMX/DMX-2 -- PowerPath 4.3.1 -- Not Installed</td><td>Cluster Software
Not Installed</td><td>Legato Automated Availability Manager (LAAM) 5.1.1 , Legato
Automated Availability Manager (LAAM) 5.0 (Base) , Oracle 9i RAC Release 2 , Veritas
Cluster Server (VCS) 2.0 , NEC ClusterPro 8.0</td><td class="noprint"><a
href='javascript:popupQualifiedConfig("csstSid=2604&c=3&d=439&s=60181&n=&v=&i=
3240&c=1&d=439&s=30147&n=&v=&i=-
1&c=26&d=439&s=61270&n=&v=&i=3242&c=9&d=439&s=-2&n=Not
Installed&v=&i=3241")'>click here</a></td></tr></table>
</text>
-<title>
Cluster Software interoperability with one ambiguous component
</title>
<id>3787</id>
</Message>
```

FIG. 3F

401 IMPORT A FIRST CONFIGURATION FILE AND A SECOND CONFIGURATION FILE INTO A FIRST CONFIGURATION TREE AND A SECOND CONFIGURATION TREE, THE FIRST CONFIGURATION FILE REPRESENTING A FIRST CONFIGURATION OF A STORAGE AREA NETWORK AND THE SECOND CONFIGURATION FILE REPRESENTING A SECOND CONFIGURATION OF THE STORAGE AREA NETWORK

↓

403 PERFORM AN UNORDERED COMPARISON ON THE FIRST CONFIGURATION TREE AND THE SECOND CONFIGURATION TREE TO PRODUCE A DIFFERENCE FILE, THE DIFFERENCE FILE IDENTIFYING CHANGES BETWEEN THE FIRST CONFIGURATION OF THE STORAGE AREA NETWORK AND THE SECOND CONFIGURATION OF THE STORAGE AREA NETWORK

↓

405 REPORT THE CHANGES IN THE CONFIGURATION OF THE STORAGE AREA NETWORK AS IDENTIFIED IN THE DIFFERENCE FILE

FIG. 4A

401 IMPORT A FIRST CONFIGURATION FILE AND A SECOND CONFIGURATION FILE INTO A FIRST CONFIGURATION TREE AND A SECOND CONFIGURATION TREE, THE FIRST CONFIGURATION FILE REPRESENTING A FIRST CONFIGURATION OF A STORAGE AREA NETWORK AND THE SECOND CONFIGURATION FILE REPRESENTING A SECOND CONFIGURATION OF THE STORAGE AREA NETWORK

404 IMPORT A FIRST CONFIGURATION FILE AND A SECOND CONFIGURATION FILE INTO A FIRST CONFIGURATION TREE AND A SECOND CONFIGURATION TREE, THE FIRST CONFIGURATION FILE REPRESENTING A CONFIGURATION OF A STORAGE AREA NETWORK AT A FIRST POINT IN TIME AND THE SECOND CONFIGURATION FILE REPRESENTING A CONFIGURATION OF THE STORAGE AREA NETWORK AT A SECOND POINT IN TIME

402 PROCESS A FIRST COMPARISON TREE AND A SECOND COMPARISON TREE FROM THE FIRST CONFIGURATION TREE AND THE SECOND CONFIGURATION TREE

403 PERFORM AN UNORDERED COMPARISON ON THE FIRST CONFIGURATION TREE AND THE SECOND COMFIGURATION TREE TO PRODUCE A DIFFERENCE FILE, THE DIFFERENCE FILE IDENTIFYING CHANGES BETWEEN THE FIRST CONFIGURATION OF THE STORAGE AREA NETWORK AND THE SECOND CONFIGURATION OF THE STORAGE AREA NETWORK

407 PERFORM AN UNORDERED COMPARISON ON THE FIRST COMPARISON TREE AND THE SECOND COMPARISON TREE TO PRODUCE A DIFFERENCE FILE, THE DIFFERENCE FILE IDENTIFYING CHANGES BETWEEN THE FIRST CONFIGURATION OF THE STORAGE AREA NETWORK AND THE SECOND CONFIGURATION OF THE STORAGE AREA NETWORK

408 PERFORM AN UNORDERED COMPARISON ON THE FIRST COMPARISON TREE AND THE SECOND COMPARISON TREE TO PRODUCE A FIRST RESULTS FILE AND A SECOND RESULTS FILE, THE FIRST RESULTS FILE AND THE SECOND RESULTS FILE IDENTIFYING CHANGES BETWEEN THE FIRST CONFIGURATION OF THE STORAGE AREA NETWORK AND THE SECOND CONFIGURATION OF THE STORAGE AREA NETWORK

TO STEP 405

FIG. 4B

501 IMPORT A FIRST CONFIGURATION FILE AND A SECOND CONFIGURATION FILE INTO A FIRST CONFIGURATION TREE AND A SECOND CONFIGURATION TREE, THE FIRST CONFIGURATION FILE REPRESENTING A FIRST CONFIGURATION OF A STORAGE AREA NETWORK AND THE SECOND CONFIGURATION FILE REPRESENTING A SECOND CONFIGURATION OF THE STORAGE AREA NETWORK

↓

502 PROCESS A FIRST COMPARISON TREE AND A SECOND COMPARISON TREE FROM THE FIRST CONFIGURATION TREE AND THE SECOND CONFIGURATION TREE

504 ADD POINTERS TO THE FIRST COMPARISON TREE AND TO THE SECOND COMPARISON TREE, EACH POINTER IN THE FIRST COMPARISON TREE REFERRING BACK TO THE EQUIVALENT PART OF THE FIRST CONFIGURATION TREE AND EACH POINTER IN THE SECOND COMPARISON TREE REFERRING BACK TO THE EQUIVALENT PART OF THE SECOND CONFIGURATION TREE

↓

503 PERFORM AN UNORDERED COMPARISON ON THE FIRST COMPARISON TREE AND THE SECOND COMPARISON TREE TO PRODUCE A FIRST RESULTS FILE AND A SECOND RESULTS FILE, THE FIRST RESULTS FILE AND THE SECOND RESULTS FILE IDENTIFYING CHANGES IN THE FIRST CONFIGURATION OF THE STORAGE AREA NETWORK AND THE SECOND CONFIGURATION OF THE STORAGE AREA NETWORK, WHEREIN THE POINTERS ADDED TO THE FIRST COMPARISON TREE AND THE SECOND COMPARISON TREE ARE PRESENT IN THE FIRST RESULTS FILE AND THE SECOND RESULTS FILE

↓

505 MAP THE IDENTIFIED CHANGES IN THE FIRST RESULTS FILE BACK TO THE FIRST CONFIGURATION TREE THROUGH THE POINTERS IN THE FIRST RESULTS FILE; AND MAP THE IDENTIFIED CHANGES IN THE SECOND RESULTS FILE BACK TO THE SECOND CONFIGURATION TREE THROUGH THE POINTERS IN THE SECOND RESULTS FILE

↓

506 REPORT THE IDENTIFIED CHANGES IN THE CONFIGURATION OF THE STORAGE AREA NETWORK FROM THE MAPPED FIRST CONFIGURATION FILE AND THE MAPPED SECOND CONFIGURATION FILE

FIG. 5

Compare Report - Mozilla Firefox

File Edit View Go Bookmarks Tools Help

Design Comparison
This section lists design element differences between the design dated May 11, 2006 1:20:19 PM PDT and the design dated May 26, 2006 4:13:19 PM PDT.

| ESM_Report | ESM_Report_Copy |
|---|---|
| \| Last Saved Date: May 11, 2006 13:20 | \| Last Saved Date: May 26, 2006 16:13 |
| Validated using June 2006 ESM and Rule Set saved by SAN Advisor on Apr 24, 2006 3:22:52 PM PDT version 1.1 | Validated using June 2006 ESM and Rule Set saved by SAN Advisor on Apr 24, 2006 3:22:52 PM PDT version 1.1 |
| \| Product Version: 5.3.10.228 | \| Product Version: 5.3.14.265 |
| Status: Invalid | Status: Invalid |
| Site | Site |
| Site 1 | Site 1 |
| Host | Host |
| Sever-01 | Sever-01 |
| HBA1 | - ~~HBA1~~ |
| Emulex LP10000-E | - ~~Emulex LP10000-E~~ |
| Driver : 2.40a2 | - ~~Driver : 2.40a2~~ |
| Firmware : 1.91a1 | - ~~Firmware : 1.91a1~~ |
| Port Speed (Gbps) : 2 | - ~~Port Speed (Gbps) : 2~~ |
| Port Connections | - ~~Port Connections~~ |
| 0 : Fabric2/Mesh A/Switch0:1 (FC-AL,FC-SW) | - ~~0 : Fabric2/Mesh A/Switch0:1 (FC-AL,FC-SW)~~ |
| | + HBA2 |
| | + Bull 2Gbps FC Mezzanine Card - Dual port for NovaScale Blade Series CFSN202-1100 |
| | + Driver : 9.1.0.10 |
| | + Firmware : 1.00X5 |
| | + Port Speed (Gbps) : 2 |
| | + Port Connections |
| | + 0 : Spare |
| | + 1 : Spare |
| Storage | Storage |
| Tape Library | Tape Library |
| Tape | Tape |
| Fabric | Fabric |
| Zoning | Zoning |
| Fabric | Fabric |
| Fabric2 | Fabric2 |
| Mesh A | Mesh A |
| Switch0 | Switch0 |
| Card0 | Card0 |
| 1 : Sever-01/HBA1:0 (FC-AL,FC-SW) | 1 : Spare |
| Zoning | Zoning |
| Bridge | Bridge |
| Remote Device | Remote Device |

Blue = New elements. Each new element has a blue + (plus) icon.
Orange = Changed elements. Each change has an orange | (bar) icon.
~~Black crossed-out~~ = Removed elements. Each removed element has a black - (minus) icon.

FIG. 7B

METHODS AND SYSTEMS FOR COMPARING STORAGE AREA NETWORK CONFIGURATIONS

BACKGROUND

The rapid expansion of information service and data processing industries has resulted in a need for computer systems to manage and store large amounts of data. As an example, financial service industry businesses such as banks, mutual fund companies or the like often operate large and complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems.

Elements of a typical conventional storage area network implementation include one or more connectivity devices such as high speed data switches or routers that interconnect the various data storage systems to each other and to one or more host or server computer systems (servers) that require access to (e.g., read and/or write) the data in the data storage systems on behalf of client software applications and/or client computer systems.

A developer or administrator of such a storage area network environment may install one or more distributed storage area network management software applications within the storage area network to manage or administer the various elements (i.e., devices, computer systems, storage systems, etc.) that operate within the storage area network. A network manager (i.e., a user) responsible for management of the storage area network operates the network management software application to perform management tasks such as performance monitoring, network analysis and remote configuration and administration of the various components operating within the storage area network.

A typical conventional storage area network management software application may have several different software components that execute independently of each other on different computer systems but that collectively interoperate together to perform network management. As an example, conventional designs of storage area network management applications can include console, server, agent and storage software components.

Generally, the server component operates as a central control process within the storage area network management application and coordinates communication between the console, storage and agent components. The console component often executes within a dedicated storage area network management workstation to allow the network administrator to visualize and remotely control and manage the various elements within the storage area network that are graphically represented within the console. Certain console applications include Graphical User Interface (GUI) software programs that enable network managers to graphically manage, control and configure various types of hardware and software resources or managed entities associated with a corresponding managed network. In one conventional storage area network management application, rendering the graphical user interface enables the network manager to graphically select, interact with, and manage local or remote devices and associated software processes operating in the network. More specifically, based on use of the graphical user interface in combination with an input device such as a hand operated keyboard and/or mouse and corresponding pointer displayed on a viewing screen, a network manager is able to manage hardware and software entities such as storage devices, peripherals, network data communications devices, and so forth associated with the network. Typically, in such network management applications, a network manager may select a displayed icon representing a corresponding resource in the storage area network and apply a management command in order to display corresponding management information.

Enterprise Storage Networks are large and complex environments that include various elements such as storage arrays, switches, hosts and databases all inter-networked. These elements occur in several hundreds in such environments. These elements in turn may consist of several hundred thousands of manageable elements such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass. ECC includes agents that are deployed on storage elements for the purpose of gathering data about these elements, components that process and persist data, applications that use persisted information to enable the management of these environments. ECC identifies the entire process of retrieving the collected data from agents to data persistence as a transaction. Additional software applications may interact with ECC to obtain information that may be used by a user to design and refine the configuration of the storage area network, such as the SAN Advisor family of products, also available from EMC Corporation of Hopkinton, Mass.

SUMMARY

The configuration of a storage area network undergoes frequent changes over time. Additional storage elements may need to be added as the amount of data stored in the storage area network grows. Components may malfunction and need to be temporarily disabled until repairs are made. Components may also fail entirely, requiring replacement by a similar component, or perhaps a newer or updated version of the older failed component. Before any changes are made, a storage area network administrator or manager may model the proposed configuration in software. This model allows the administrator to test the proposed configuration before any actual changes are made, so that any problems with the proposed configuration are found in advance, as any such problems would need to be quickly addressed. Conventional technologies for storage area network design and configuration are able to gather data describing the configuration of the storage area network at a point in time, so that a proposed configuration may be quickly and easily tested. However, these technologies do not provide a mechanism to compare different configurations of the storage area network, or to compare the configuration of the storage area network at one point in time with the configuration of the storage area network at another point in time.

Embodiments disclosed below allow for comparing configurations of a storage area network, and for comparing configurations of a storage area network at different points in time. Data describing the configuration of a storage area network is collected and stored in a file. This process is repeated, presumably when the configuration of the storage area network has changed and thus the data describing it will have changed, resulting in a second file that is separate from the first. Then, an unordered comparison is performed on the two files, with the results of the comparison indicating the differences between the data of each of the two files, and thus indicating the differences between the configurations of the storage area network. The results of the unordered comparison may then be reported to a user, such as a storage area network manager or administrator, so that the user is able to see the changes in the configuration of the storage area network. The results of the comparison may be stored for future analysis, or supplemented by the results of further comparisons.

More particularly, in an embodiment there is provided a method of comparing configurations of a storage area network. The method includes importing a first configuration file and a second configuration file into a first configuration tree and a second configuration tree, the first configuration file representing a first configuration of a storage area network and the second configuration file representing a second configuration of the storage area network; and performing an unordered comparison on the first configuration tree and the second configuration tree to produce a difference file, the difference file identifying changes between the first configuration of the storage area network and the second configuration of the storage area network.

In a related embodiment, the method may include processing the first configuration tree and the second configuration tree into a first comparison tree and a second comparison tree; and performing may include performing an unordered comparison on the first comparison tree and the second comparison tree to produce a difference file, the difference file identifying changes between the first configuration of the storage area network and the second configuration of the storage area network. In a further related embodiment, performing may include performing an unordered comparison on the first comparison tree and the second comparison tree to produce a first results file and a second results file, the first results file and a second results file identifying changes between the first configuration of the storage area network and the second configuration of the storage area network.

In yet another further related embodiment, processing may include adding pointers to the first comparison tree and to the second comparison tree, each pointer in the first comparison tree referring back to the equivalent part of the first configuration tree and each pointer in the second comparison tree referring back to the equivalent part of the second configuration tree; wherein the pointers added to the first comparison tree and to the second comparison tree are present in the first results file and the second results file. In still another further related embodiment, the method may include mapping the identified changes in the first results file back to the first configuration tree through the pointers in the first results file; and mapping the identified changes in the second results file back to the second configuration tree through the pointers in the second results file. In yet still another further related embodiment, the method may include reporting the identified changes in the configuration of the storage area network from the mapped first configuration tree and the mapped second configuration tree. In still another further related embodiment, importing may include importing a first configuration file and a second configuration file into a first configuration tree and a second configuration tree, the first configuration file representing a configuration of a storage area network at a first point in time and the second configuration file representing a configuration of the storage area network at a second point in time; and reporting may include reporting the changes in the configuration of the storage area network from the first time to the second time as identified in the first results file and in the second results file.

In another related embodiment, the method may include reporting the changes in the configuration of the storage area network as identified in the difference file. In yet another related embodiment, importing may include importing a plurality of configuration files into a plurality of configuration trees, each configuration file representing the configuration of the storage area network at a different point in time for a comparison period of time; and performing may include performing an unordered comparison on the plurality of configuration trees to produce a plurality of results files, the plurality of results files identifying changes in the configuration of the storage area network over the comparison period of time. In a further related embodiment, processing may include processing each configuration tree into a comparison tree, resulting in a plurality of comparison trees; and performing may include performing an unordered comparison on the plurality of comparison trees to produce a plurality of results files, the plurality of results files identifying changes in the configuration of the storage area network over the comparison period of time; and the method may include reporting the changes in the configuration of the storage area network over the comparison period of time as identified in the plurality of results file to indicate changes in the configuration of the storage area network over the comparison period of time.

In another embodiment, there is provided a computer system including a memory, a processor, a display, and an interconnection mechanism coupling the memory, the processor and the display allowing communication there between. The memory of the computer system is encoded with a comparison application, that when executed in the processor, provides a comparison process that compares configurations of a storage area network, by causing the computer system to perform the operations of: importing a first configuration file and a second configuration file into a first configuration tree and a second configuration tree, the first configuration file representing a first configuration of a storage area network and the second configuration file representing a second configuration of the storage area network; and performing an unordered comparison on the first comparison tree and the second configuration tree to produce a difference file, the difference file identifying changes between the first configuration of the storage area network and the second configuration of the storage area network.

In yet another embodiment, there is provided a computer program product, stored on computer readable medium, to compare configurations of a storage area network. The computer program product includes computer program code for importing a first configuration file and a second configuration file into a first configuration tree and a second configuration tree, the first configuration file representing a first configuration of a storage area network and the second configuration file representing a second configuration of the storage area network; and computer program code for performing an unordered comparison on the first comparison tree and the second comparison tree to produce a difference file, the difference file identifying changes between the first configuration of the storage area network and the second configuration of the storage area network.

It is to be understood that the system of the present application can be embodied solely as a software program, or as a software program operating in conjunction with corresponding hardware. For example, embodiments of the present application may be implemented in EMC's SAN Advisor software application that provides graphical configuration management functionality of storage area network resources.

Embodiments of the present application may also be implemented in computer devices that operate the SAN Advisor software. SAN Advisor software is manufactured by EMC Corporation of Hopkinton, Mass., USA.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 3A, 3B, 3C, 3D, 3E, and 3F are portions of XML code taken from a configuration file that may be acted upon by the system of FIG. 1.

FIGS. 4A, 4B, and 4C illustrate flowcharts of a procedure performed by the system of FIG. 1 when comparing two configurations of a storage area network.

FIG. 5 illustrates a flowchart of a procedure performed by the system of FIG. 1 when mapping identified changes found in comparing the configurations of a storage area network back to files describing the configurations of the storage area network.

FIGS. 7A and 7B are screenshots of a report of differences between the configurations of a storage area network generated according to one embodiment disclosed herein.

DETAILED DESCRIPTION

Generally, disclosed embodiments include methods and systems for comparing the configuration of a storage area network at two distinct points in time. The configurations of a storage area network may change frequently over time. For example, one or more components of the storage area network may fail and must be repaired or replaced, or new components may be added to increase the available amount of storage. Typically, before changes are made to a storage area network, a storage area network administrator or other user will devise a proposed configuration for the storage area network. A proposed storage area network configuration is a model of the storage area network that incorporates the changed and/or new components in the overall design of the storage area network. The proposed configuration thus also includes data representing the current configuration of the storage area network. A storage area network administrator may use a tool such as the SAN Advisor program, to create the proposed configuration. Using SAN Advisor, the storage area network administrator is also able to test the proposed configuration of the storage area network to identify any problems or errors caused by the changed and/or new components prior to the actual installation of those components. However, neither SAN Advisor nor other conventional storage area network management technologies allow a user to compare configurations of a storage area network.

Figure 1:
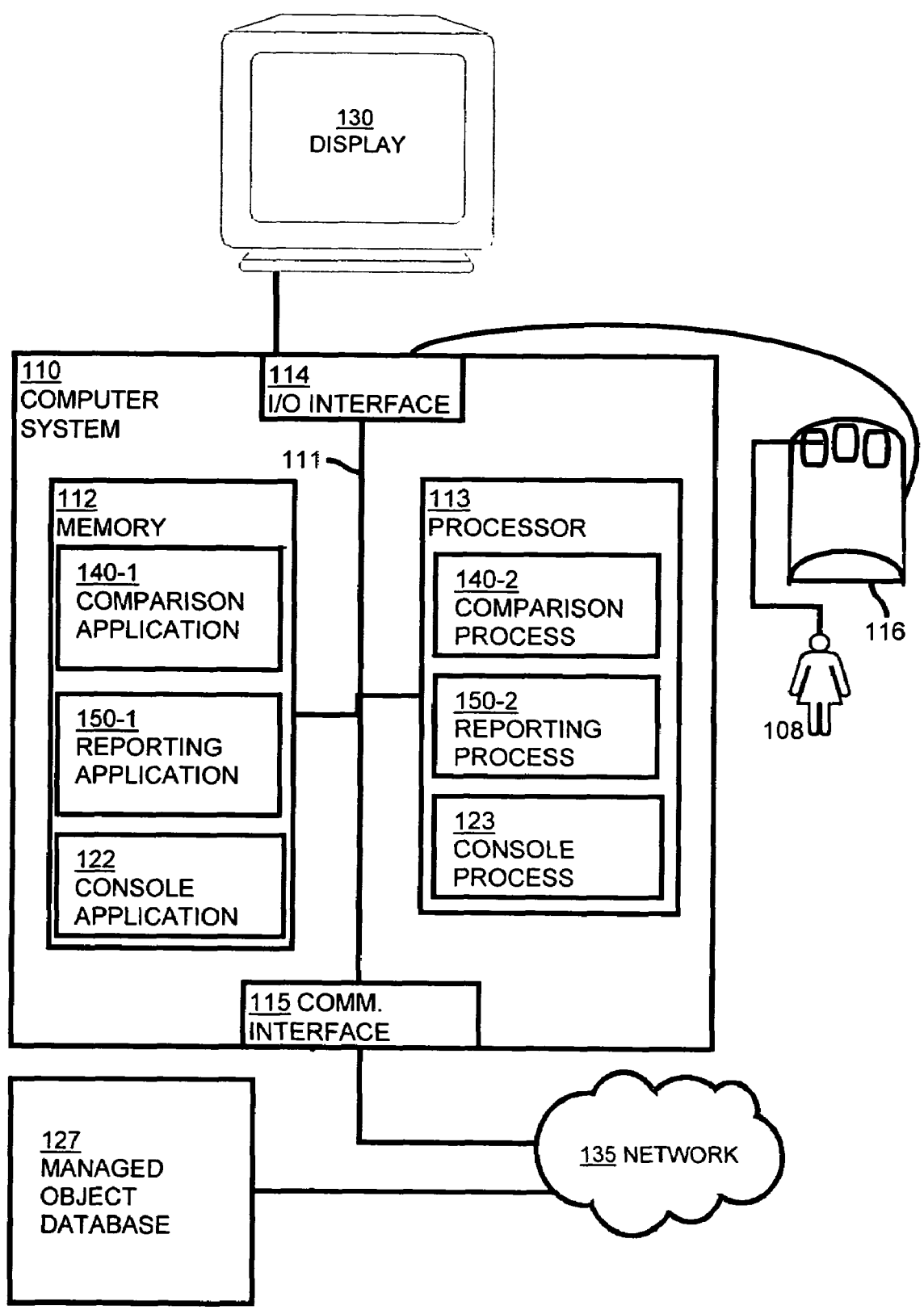
FIG. 1 shows a high-level block diagram of a computer system according to one embodiment disclosed herein.

Embodiments disclosed herein provide for comparing configurations of a storage area network, as described below. More particularly, FIG. 1 is a block diagram illustrating example architecture of a computer system 110 that executes, runs, interprets, operates or otherwise performs a comparison application 140-1 and a comparison process 140-2, as well as reporting application 150-1 and a reporting process 150-2, suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a keyboard, mouse, touchpad, trackball, etc.) couples to the processor 113 through the I/O interface 114 and enables a user 108 such as a system administrator of a storage area network to provide input commands and generally administer the storage area network through the graphical user interface (shown in FIGS. 2A and 2B) that is provided on a display 130. The communications interface 115 enables the computer system 110 to communicate with other devices on a network 135, such as but not limited to components of the storage area network (not shown) and a managed object database 127.

The memory system 112 is any type of computer readable medium and in this example is encoded with a comparison application 140-1 that includes comparison process 140-2 and a reporting application 150-1 that includes a reporting process 150-2. The comparison application 140-1 and/or the reporting application 150-1 may be embodied as software code such as data and/or logic instructions (e.g., code stored in the memory system 112 or on another computer readable medium such as a removable disk) that supports processing functionality according to different embodiments described herein. A console application 122 may also be embodied as software code in the memory system 112. During operation of the computer system 110, the processor 113 accesses the memory system 112 via the interconnection mechanism 111 in order to launch, run, execute, interpret or otherwise perform the logic instructions of the comparison application 140-1 as well as the reporting application 150 and the console application 122. Execution of the comparison application 140-1 in this manner produces processing functionality in a comparison process 140-2. Similarly, execution of the reporting application 150-1 produces processing functionality in a reporting process 150-2, and execution of the console application 122 produces processing functionality in a console process 123. In other words, the comparison process 140-2 represents one or more portions or runtime instances of the comparison application 140-1 performing or executing within or upon the processor 113 in the computer system 110 at runtime.

It is noted that example configurations disclosed herein include the comparison application 140-1 itself including the comparison process 140-2 as well as the reporting application 150-1 itself including the reporting process 150-2 (i.e., in the form of un-executed or non-performing logic instructions and/or data). The comparison application 140-1 and the reporting application 150-1 may be stored on a computer readable medium (such as a floppy disk), hard disk, electronic, magnetic, optical or other computer readable medium. The comparison application 140-1 and the reporting application 150-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the comparison application 140-1 in the processor 113 as the comparison process 140-2, and the execution of the reporting application 150-1 in the processor 113 as the reporting process 150-2. Those skilled in the art will understand that the computer system 110 may include other processes and/or software and hardware components, such as an operating system not shown in this example.

Figure 2A:
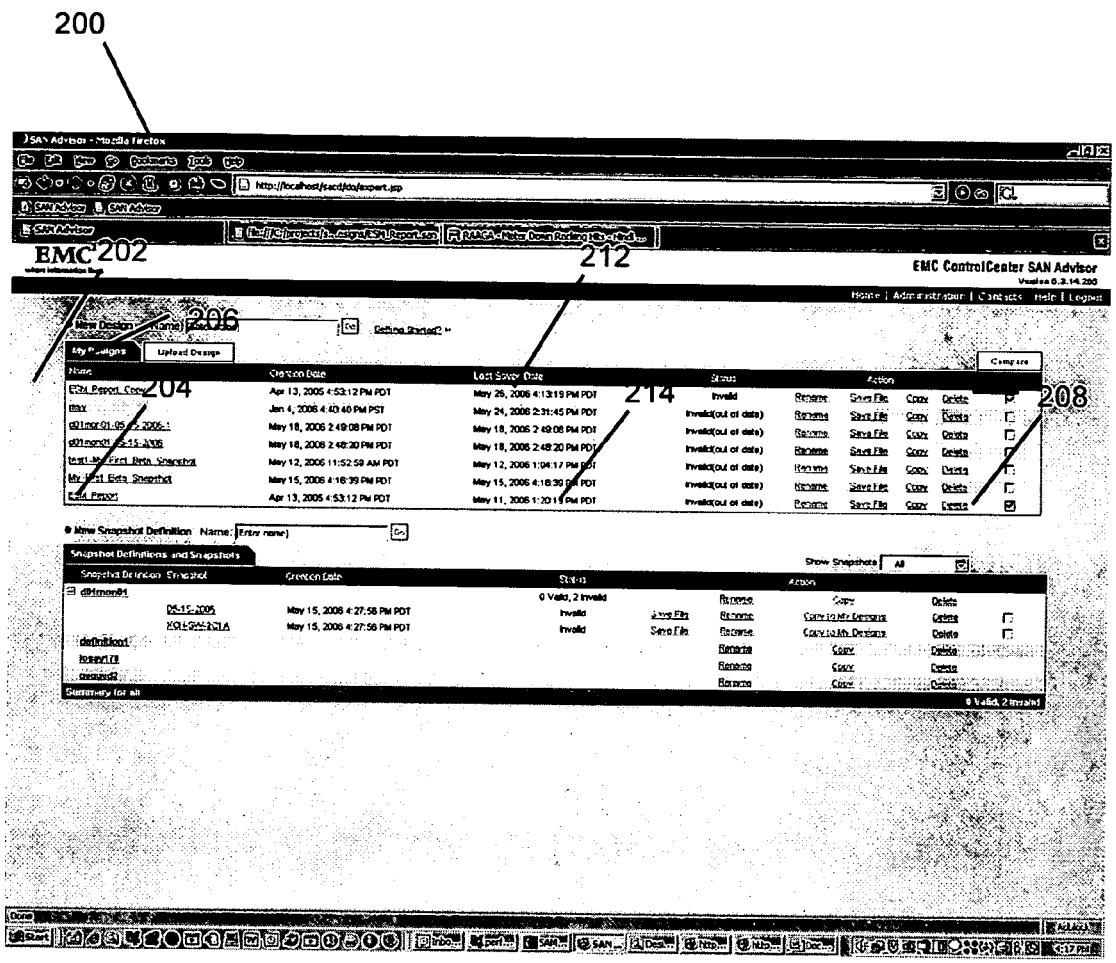
FIGS. 2A and 2B are screenshots of graphical user interface-based software applications that execute on the computer system of FIG. 1.
Figure 2B:
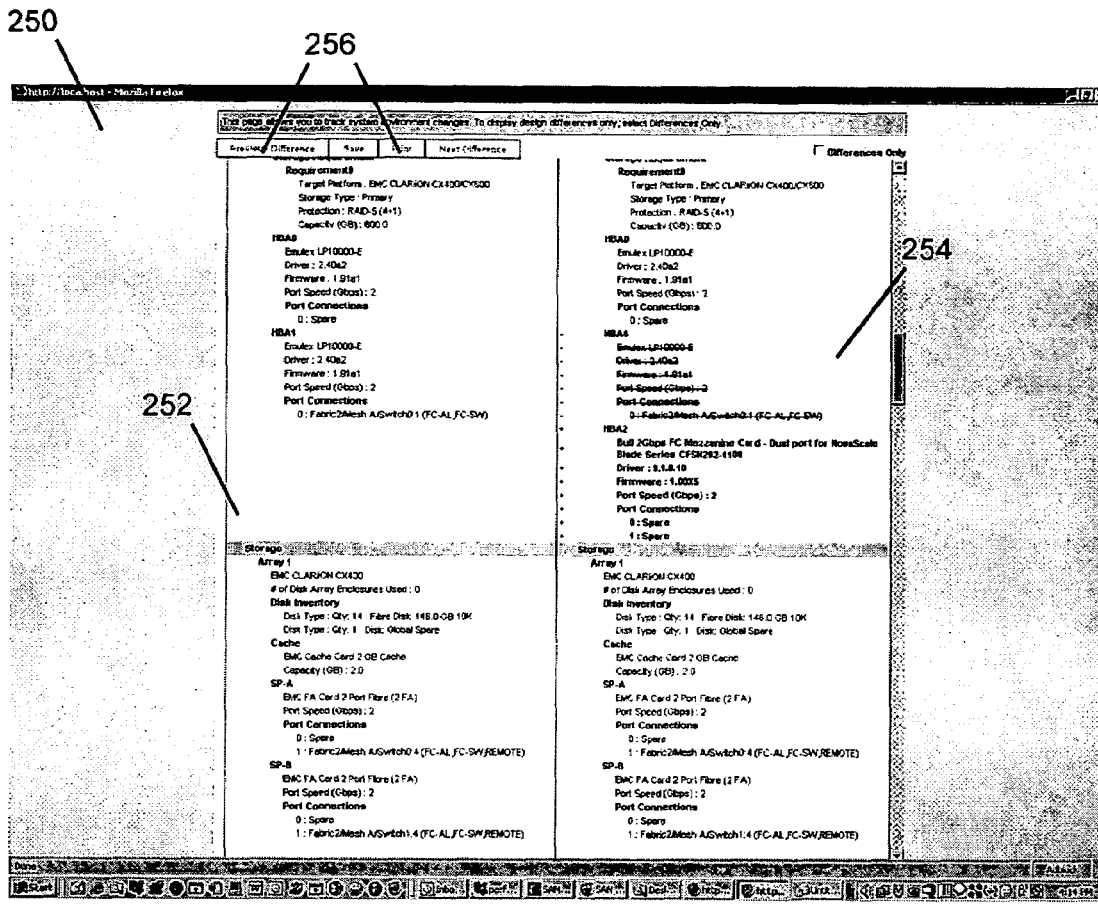
Figure 4C:
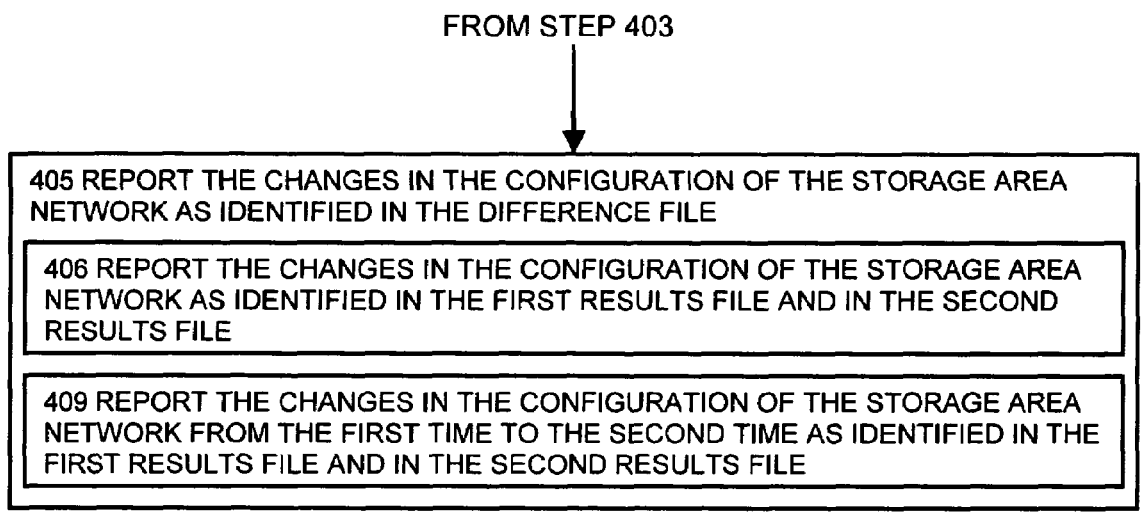

FIG. 2A is a screenshot of the comparison application 140-1 executing as the comparison process 140-2, as shown on the display 130 (shown in FIG. 1). FIG. 2B is a screenshot of the reporting application 150-1 executing as the reporting process 150-2, as shown on the display 130. FIGS. 3A-3F illustrate portions of XML code that represent an example configuration file used by the comparison application 140-1. FIGS. 4A, 4B, and 4C illustrate flowcharts of an embodiment of the comparison application 140-1 as performed by the system of FIG. 1 when comparing two configurations of a storage area network.

In FIG. 2A, a user 108 (shown in FIG. 1), such as a storage area network administrator, using an input device 116 (shown in FIG. 1) on the GUI 200 has selected two storage area network configuration trees 202, 204 from an available list of configuration trees 206 for a particular storage area network. The configuration trees are formatted versions of configuration files that describe the configuration of the storage area network that are compatible with the comparison application 140-1. The selected configuration trees 202, 204 are indicated by the checks in checkboxes 208. Each storage area network configuration tree 202, 204 has a time 212, 214 associated with it. The time 212, 214 indicates the last point in time at which the storage area network configuration trees 202, 204 was updated to reflect the then-current configuration of the storage area network. The time 212, 214 is taken from the configuration file that forms the basis for the configuration tree.

The comparison process 140-2 populates the list of configuration trees 206 by importing one or more configuration files into a corresponding number of configuration trees, step 401. The comparison process 140-2 may import a configuration file or files from a data source such as a managed object database 127 (shown in FIG. 1). The managed object database 127 stores data about each component of the storage area network in the form of managed objects. When the comparison process 140-2 imports a configuration file from the managed object database 127, the comparison process 140-2 takes a snapshot of the current configuration of the storage area network using the data contained within the managed objects, and places the data into an XML file format, though any file format may be used. The XML format configuration file is then imported into a DOM tree format configuration tree that is compatible with the comparison process 140-2. Each component of the storage area network is identified in the configuration file and thus the configuration tree, as well as the connections between components, and data about each component and each connection. For example, for a storage device in the storage area network, the configuration file (and thus the configuration tree) may include data such as the manufacturer of the storage device, the type of storage device, the types of storage within the device and their capacity, and so on, as shown in the example XML code in FIG. 3A. Further examples of the data a configuration file may include, when in XML format, may be seen in FIGS. 3B (a server in the storage area network), 3C (a switch in the storage area network), and 3D (a bridge in the storage area network). A configuration file may also include data concerning when the comparison process 140-2 took the snapshot of the storage area network, i.e., at what point in time the configuration file represents the then-current configuration of the storage area network, as seen in FIG. 3E. A configuration file when imported into a configuration tree may also include error data representing any problems with the imported configuration of the storage area network, as shown in FIG. 3F. Additional logic present within the comparison application 140-1 may check the configuration as represented by the configuration file to validate the configuration when the comparison process 140-2 imports the configuration file into a configuration tree. For example, the additional logic may verify compatibility between components and connections, and indicate A configuration file may also be created, either from scratch or from an existing configuration file, and then imported into a configuration tree by the comparison process 140-2. For example, the storage area network administrator 108 may be looking to expand the storage capacity of the storage area network, and may be considering purchasing several new storage devices. The storage area network administrator 108 knows how he/she will configure the storage area network to include the new storage devices. To test this configuration before expending the capital on the storage devices, so as to identify any problems in advance, the storage area network administrator 108 creates a hypothetical storage area network configuration file. Such a configuration file contains the same kinds of data found a storage area network configuration file that is imported into a configuration tree by the comparison process 140-2 from external sources, such as the managed object database 127, and may be in XML format as well. The different types of data as shown in FIGS. 3A-3E may be present in the hypothetical configuration file, though the data indicating the status of the configuration will indicate when the hypothetical configuration file was created as opposed to the time at which the configuration file was imported. Further, the hypothetical configuration file may be validated by the additional logic of the comparison application 140-1.

As the configuration of the storage area network changes over time, the comparison process 140-2 may, at different points in time, take further snapshots of the storage area network and import the configuration files into configuration trees, where the configuration files represent the configuration of the storage area network at those points in time, in order for the user 108 to compare configurations of the storage area network at the different points in time, step 404. As long as the comparison process 140-1 has imported at least two configuration files into two configuration trees, representing two configurations of the storage area network, a comparison may be made. The user 108 may instruct the comparison application 140-1 to take a snapshot of the current configuration of the storage area network, and thus import a configuration file representing the current configuration of the storage area network into a configuration tree, by inputting commands through the input device 116. The comparison application 140-2 may alternatively be configured to import a configuration file into a configuration tree at a scheduled time. This may be a one-time only command, for example import a configuration file into a configuration tree on Friday, Jun. 30, 2006, at 5 PM, or it may be a recurring command, such as import a configuration file into a configuration tree each Friday at 2 AM, or every ten minutes. The user 108 may configure the comparison application 140-1 to import configuration files into configuration trees as often as desired or needed.

With the configuration files having been imported into configuration trees, and the configuration trees available to be selected to be compared, the user 108 selects two configuration trees, such as the configuration trees 202, 204 seen in FIG. 2A. The user next uses the input device 116 to activate a compare button 220. The activation of the compare button 220 causes the comparison process 140-2 to perform an unordered comparison on the two configuration trees, ultimately producing a difference file, step 403. The comparison process 140-2 may execute a comparison routine, such as the X-diff program created by Yuan Wang, David J. DeWitt, and Jin-Yi Cai and freely available on the Internet, to perform the unordered comparison. The comparison process 140-2 performs an unordered comparison so that the organization of the configuration trees is not pertinent to the comparison. Same components of the storage area network found in each configuration tree will be identified in an unordered comparison, even if the data describing those components is at different locations in each configuration tree. The difference file identifies changes between the configurations of the storage area network.

Figure 7A:
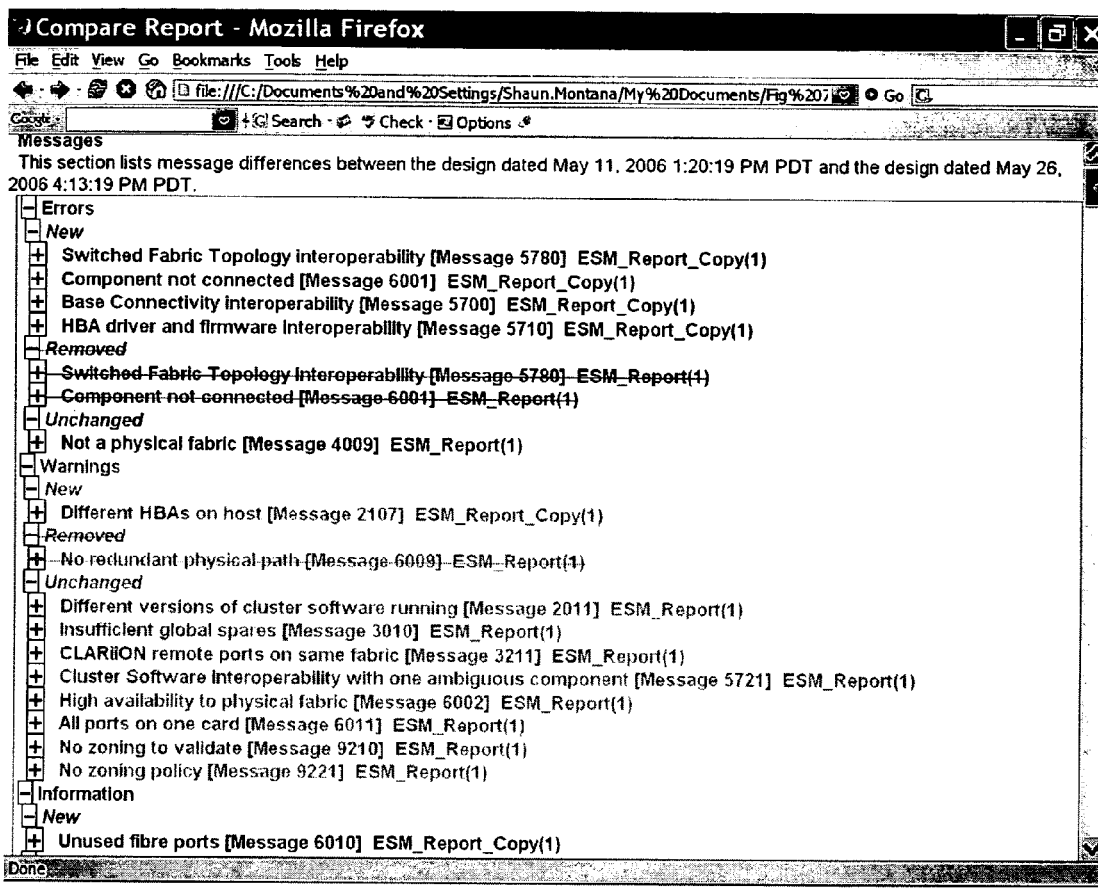

The comparison process 140-2 may now call a reporting application 150-1, executing as a reporting process 150-2, to report the changes in the configuration of the storage area network as identified in the difference file, step 405. The reporting process 150-2 receives the difference file as input from the comparison process 140-2, and generates the report. The report may be in any format, though in a preferred embodiment, the reporting process 150-2 creates the report in an HTML format, requiring the reporting process 150-2 to convert the data contained within the difference file to HTML. During a conversion from the format of the difference file into the format of the report, if the reporting process 150-2 encounters a cryptic tag or descriptor of some part of the storage area network configuration that the reporting process 150-2 does not recognize, the reporting process 150-2 may access a translation file. The translation file allows the reporting process 150-2 to change the cryptic tag or unknown descriptor into something that will be understandable in the report. The report and/or the difference file may then be shown on the display 130, FIG. 2B being an example of this. Here, a report 250 contains a first listing 252 corresponding to a first configuration of the storage area network shown side-by-side with a second listing 254 corresponding to a second configuration of the storage area network, with the changes between the two indicated in the second listing 254. A component removed from the storage area network is indicated by strikethrough, while a newly added storage area network component is indicated by bold text of a different color than the rest of the text and a changed storage area network component is indicated by yet another different color, though any font changes or other indicators that clearly show any changes may be used. The user 108 is able to step through the report 250 change-by-change by using buttons 256, and is also able to save and print the report, if desired. Further examples of the contents of a report, and how differences between storage area network configurations are identified therein, may be found in FIGS. 7A and 7B.

Depending on the comparison routine used by the comparison process 140-2 to perform the unordered comparison, the comparison process 140-2 may need to process the selected configuration trees 202, 204 into comparison trees, step 402. The comparison trees remain as separate files within the comparison process 140-2, and are not seen by the user 108. The processed comparison trees may also be DOM (document object model) trees, or any other equivalent tree structure. To expedite the processing of a configuration tree into a comparison tree, the comparison process 140-2 may create a template. The template may modify the structure of configuration tree so as to change it into a format that is compatible with, and understood by, the comparison routine used by the comparison process 140-2 to perform the actual comparison. For example, if the comparison routine used by the comparison process 140-2 to perform the comparison is the X-diff program described above, the configuration trees must be in a format that is compatible with and understood by X-diff. The configuration trees as initially created by the comparison process 140-2 importing configuration files may not be in such a format. The comparison process 140-2, when processing the configuration trees into comparison trees, would thus have to modify the format of the configuration trees when creating the comparison trees, so that the resulting comparison trees are themselves compatible with X-diff.

The configuration trees, when imported, may contain information that will not be relevant to the user 108 for purposes of comparing the storage area network configurations. This information may be information about the storage area network configuration and/or the storage area network components and/or connections that was gathered from an external source, such as the managed object database 127, when the comparison process 140-2 took a snapshot of the storage area network configuration, or it may be information added to a hypothetical configuration file that was imported into a configuration tree by the comparison process 140-2. When processing the configuration trees into comparison trees, the comparison process 140-2 is able to format the configuration trees to remove this irrelevant information from the comparison trees, to avoid providing the user 108 with information that is unhelpful in comparing the configurations of the storage area network. Simultaneously, the comparison process 140-2 may add useful information to the comparison trees when processing the comparison trees from the configuration trees, such as information from the specification sheet of each different component found in the configuration trees, such information being helpful to the user 108 in comparing the configurations of the storage area network. The removal of irrelevant information and the addition of useful information by the comparison process 140-2 may be additional parts of the template that may be used by the comparison process 140-2, as described above, to process the configuration trees into comparison trees.

When comparison trees are processed from the configuration trees, and the comparison process 140-2 calls the comparison routine to perform the unordered comparison, the unordered comparison is performed on the comparison trees producing a difference file, step 407. The comparison process 140-2 may alternatively, from performing an unordered comparison on the comparison trees, produce two results files, step 408. The results files identify what has changed between the two comparison trees. The comparison process 140-2 then walks each result file in a particular order to identify the changes in the configurations of the storage area network. A results file that corresponds to a configuration tree that represents a configuration of the storage area network at an earlier point in time than the other configuration tree in the comparison, for example, will be walked through by the comparison process 140-2 first. The comparison process 140-2 will be able to identify deletions between the configurations and changes between the configurations from this results file. The comparison process 140-2 will then walk through the other results file, and will be able to identify additions to the configuration from this results file. The results files, after being walked through by the comparison process 140-2, will identify all changes in the configuration of the storage area network from the first configuration tree as compared to the second configuration tree. The difference file may then be formed from the two results files. The results files may be entirely new files, or may be the comparison trees with the identified changes added.

The comparison process 140-2 may now call a reporting application 150-1, executing as a reporting process 150-2, to report the changes in the configuration of the storage area network as identified in the first results file and the second results file, step 406. When the configuration files represent the configuration of the storage area network at a first point in time and a second point in time, the reporting process 150-2 may report the changes in the configuration of the storage area network from the first time to the second time as identified in the first results file and in the second results file, step 409. The reporting process 150-2 receives the results files as inputs from the comparison process 140-2, and generates the report. The report may be in any format, though in a preferred embodiment, the reporting process 150-2 creates the report in an HTML format, requiring the reporting process 150-2 to convert the data contained within the results files to HTML from the X-diff specific DOM tree format back. In this situation, as the original configuration files have already been converted from an XML format to a first DOM tree format and then into the X-diff specific DOM tree format, the reporting process 150-2 may first have to undo this conversion in order to put the data into an HTML format. During a conversion from the format of the results files into the format of the report, if the reporting process 150-2 encounters a cryptic tag or descriptor of some part of the storage area network configuration that the reporting process 150-2 does not recognize, the reporting process 150-2 may access a translation file. The translation file allows the reporting process 150-2 to change the cryptic tag or unknown descriptor into something that will be understandable in the report. The report and/or the results files may then be shown on the display 130. As with the difference file, in the results files a component removed from the storage area network is indicated by strikethrough, while a newly added storage area network component is indicated by bold text of a different color than the rest of the text and a changed storage area network component is indicated by yet another different color, though any font changes or other indicators that clearly show any changes may be used.

If the unordered comparison performed by the comparison process 140-2 produces results files that are the processed comparison trees with changes added in, the reporting process 150-2 may need to be able to map the identified changes back to original configuration trees when the reporting process 150-2 converts the results files from their current format, back to the format of the original configuration files and then into the report format. FIG. 5 illustrates a flowchart of a procedure to accomplish this mapping. After the comparison process 140-2 imports the configuration files into configuration trees, step 501, the comparison process 140-2 then processes the configuration trees into comparison trees, step 502. When the comparison process 140-2 processes the configuration trees into the comparison trees, the comparison process 140-2 adds pointers to the each of the comparison trees, each pointer in a comparison tree referring back to the equivalent part of the corresponding configuration tree, step 504. A pointer is simply a reference from each element of the comparison tree back to the location, in the configuration tree, of the data contained within that element. Thus, a pointer may be used to identify where data originated from in the original configuration file. The pointers carry over regardless of any changes made to the format of the comparison tree. For example, when the comparison process 140-2 uses X-diff as its comparison routine, the pointers found in the original DOM tree structure of the configuration tree carry over to the X-diff compatible DOM tree structure of the comparison tree.

After the comparison process 140-2 has performed the unordered comparison, the results files will also contain the pointers, step 503. This allows the reporting process 150-2 to map the identified changes in the first results file back to its corresponding configuration tree through the pointers in the first results file, and to similarly map the identified changes in the second results file back to its corresponding configuration tree through the pointers in the second results file, step 505. The reporting process 150-2 then reports the identified changes in the configuration of the storage area network from the mapped first configuration tree and the mapped second configuration tree, step 506.

Figure 6A:
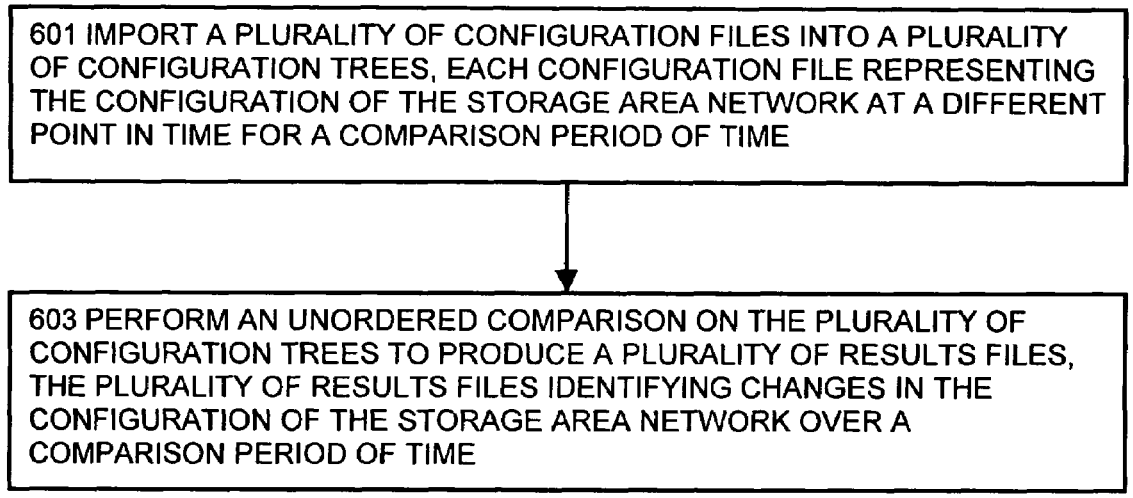
FIGS. 6A and 6B illustrate flowcharts of a procedure performed by the system of FIG. 1 when comparing the configuration of a storage area network at one point in time with the configuration of that storage area network at many other points in time.
Figure 6B:
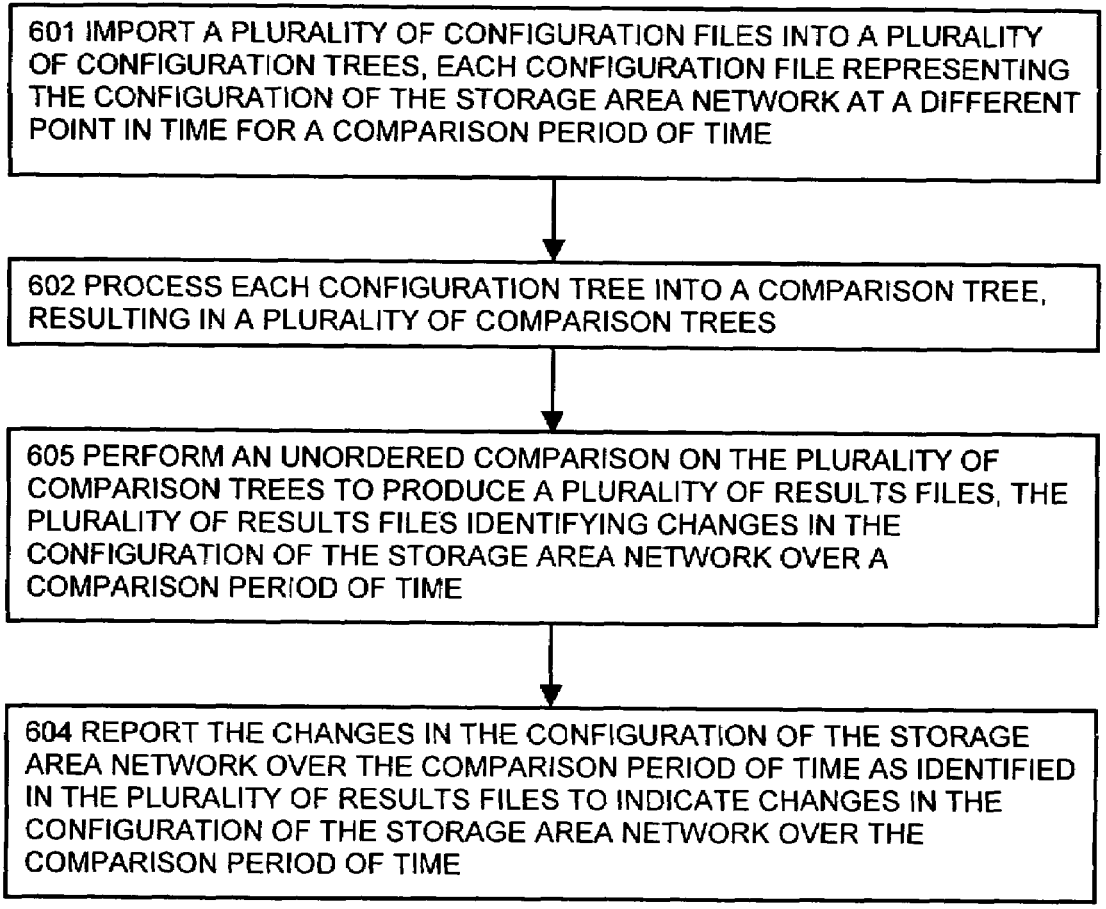

The comparison process 140-2 may not be limited to comparing two storage area network configurations, but may be used to compare multiple storage area network configurations. FIGS. 6A and 6B illustrate flowcharts that may be used to compare multiple storage area network configurations with the comparison process 140-2. The comparison process 140-2 must first have access to multiple configuration trees, so a plurality of configuration files must be imported into a plurality of configuration trees, step 601. The configuration files may represent the configuration of the storage area network at various points in time for a total period of time over which the user 108 desires to track changes in the configurations of the storage area network. This period of time may be referred to as a comparison period of time. The comparison process 140-2 then performs an unordered comparison on the plurality of configuration trees to produce a plurality of results files, step 603. The plurality of results files identifying changes in the configuration of the storage area network over the comparison period of time. If needed, the comparison process 140-2 may first processes each configuration file into a comparison tree, resulting in a plurality of comparison trees, step 602. The comparison process 140-2 will then perform an unordered comparison on the plurality of comparison trees, still resulting in a plurality of results files, step 605. Finally, the comparison process 140-2 may call the reporting application 150-1, and the reporting process 150-2 may report the changes in the configuration of the storage area network over the comparison period of time as identified in the plurality of results file to indicate trends in the configuration of the storage area network over the comparison period of time, step 604. The comparison process 140-2 may combine any of the plurality of results files to produce one or more difference files, and these may instead be reported by the reporting process 150-2.

By using the method described above and illustrated in the flowcharts of FIGS. 6A and 6B, a storage area network administrator or other user 108 may be able to identify trends in the configuration of the storage area network over time. For example, the comparison process 140-2 may be used to store the plurality of results files generated from the unordered comparison. The comparison process 140-2 or another suitable application may take the stored results file as input and analyze the inputted results files to find trends in the configuration of the storage area network. The storage area network administrator or other user 108 may utilize a similar method to track changes in certain components or connections of the storage area network as opposed to the entire configuration of the storage area network. For example, the stored results files may be analyzed to identify the changing amounts of storage elements in the storage area network over time, or to identify the changing capacity of the storage elements in the storage area network over time. Any of these trends may then be displayed on the display 130, either by the reporting process 150-2 or another suitable process.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A computer-implemented method of comparing configurations of a storage area network in which a computer system performs operations comprising:

importing a first configuration file and a second configuration file into a first configuration tree and a second configuration tree, the first configuration file representing a first configuration of a storage area network and the second configuration file representing a second configuration of the storage area network;

processing the first configuration tree and the second configuration tree into a first comparison tree and a second comparison tree, wherein processing the first configuration tree and the second configuration tree comprises:

converting or modifying the format of the first and second configuration trees to one that is compatible with a comparison routine that performs an unordered comparison;

removing irrelevant information and/or inserting additional information into the first and second comparison trees; and adding pointers to the first comparison tree and to the second comparison tree, each pointer in the first comparison tree referring back to the equivalent part of the first configuration tree and each pointer in the second comparison tree referring back to the equivalent part of the second configuration tree, wherein the pointers carry over regardless of any changes made to the format of the first and second comparison trees; and performing the unordered comparison on the first configuration tree and the second configuration tree to produce a difference file, the difference file identifying changes between the first configuration of the storage area network and the second configuration of the storage area network.

2. The method of claim 1:

wherein performing the unordered comparison comprises:

performing an unordered comparison on the first comparison tree and the second comparison tree to produce a difference file, the difference file identifying changes between the first configuration of the storage area network and the second configuration of the storage area network.

3. The method of claim 2 wherein performing an unordered comparison on the first comparison tree and the second comparison tree comprises:

performing an unordered comparison on the first comparison tree and the second comparison tree to produce a first results file and a second results file, the first results file and a second results file identifying changes between the first configuration of the storage area network and the second configuration of the storage area network.

4. The method of claim 3 wherein the pointers added to the first comparison tree and to the second comparison tree are present in the first results file and the second results file.

5. The method of claim 1 comprising:

mapping the identified changes in the first results file back to the first configuration tree through the pointers in the first results file; and mapping the identified changes in the second results file back to the second configuration tree through the pointers in the second results file.

6. The method of claim 5 comprising:

reporting the identified changes in the configuration of the storage area network from the mapped first configuration tree and the mapped second configuration tree.

7. The method of claim 6, wherein importing a first configuration file and a second configuration file comprises:

importing a first configuration file and a second configuration file into a first configuration tree and a second configuration tree, the first configuration file representing a configuration of a storage area network at a first point in time and the second configuration file representing a configuration of the storage area network at a second point in time;

and wherein reporting the identified changes comprises:

reporting the changes in the configuration of the storage area network from the first point in time to the second point in time as identified in the first results file and in the second results file.

8. The method of claim 1 comprising:

reporting the changes in the configuration of the storage area network as identified in the difference file.

9. The method of claim 1 wherein importing a first configuration file and a second configuration file comprises:

importing a plurality of configuration files into a plurality of configuration trees, each configuration file representing the configuration of the storage area network at a different point in time for a comparison period of time;

and wherein performing comprises:

performing an unordered comparison on the plurality of configuration trees to produce a plurality of results files, the plurality of results files identifying changes in the configuration of the storage area network over the comparison period of time.

10. The method of claim 9 comprising:

processing each configuration tree into a comparison tree, resulting in a plurality of comparison trees;

wherein performing an unordered comparison on the plurality of configuration trees comprises:

performing an unordered comparison on the plurality of comparison trees to produce a plurality of results files, the plurality of results files identifying changes in the configuration of the storage area network over the comparison period of time;

and the method comprises:

reporting the changes in the configuration of the storage area network over the comparison period of time as identified in the plurality of results file to indicate changes in the configuration of the storage area network over the comparison period of time.

11. The method of claim 1 wherein importing a first configuration file and a second configuration file comprises:

identifying error data within at least one of the first configuration file and the second configuration file, the error data indicating at least one problem with at least one of:

i) the first configuration of the storage area network, and ii) the second configuration of the storage area network.

12. The method of claim 6 wherein reporting the identified changes comprises:

converting a format of the difference file to a HTML format to create a report, wherein the converting comprises:

identifying an unknown descriptor within the difference file; and accessing a translation file, the translation file changing the unknown descriptor into a known descriptor, the known descriptor identifiable in the report.

13. A computer system comprising:

a memory;

a processor;

a display;

an interconnection mechanism coupling the memory, the processor and the display allowing communication therebetween;

wherein the memory is encoded with a comparison application, that when executed in the processor, provides a comparison process that compares configurations of a storage area network, by causing the computer system to perform the operations of:

importing a first configuration file and a second configuration file into a first configuration tree and a second configuration tree, the first configuration file representing a first configuration of a storage area network and the second configuration file representing a second configuration of the storage area network;

processing the first configuration tree and the second configuration tree into a first comparison tree and a second comparison tree, wherein processing the first configuration tree and the second configuration tree comprises:

converting or modifying the format of the first and second configuration trees to one that is compatible with a comparison routine that performs an unordered comparison;

removing irrelevant information and/or inserting additional information into the first and second comparison trees; and adding pointers to the first comparison tree and to the second comparison tree, each pointer in the first comparison tree referring back to the equivalent part of the first configuration tree and each pointer in the second comparison tree referring back to the equivalent part of the second configuration tree, wherein the pointers carry over regardless of any changes made to the format of the first and second comparison trees; and performing the unordered comparison on the first configuration tree and the second configuration tree to produce a first results file and a second results file, the first results file and the second results file identifying changes between the first configuration of the storage area network and the second configuration of the storage area network.

14. The computer system of claim 13 wherein performing the unordered comparison comprises:

performing an unordered comparison on the first comparison tree and the second comparison tree to produce a difference file, the difference file identifying changes between the first configuration of the storage area network and the second configuration of the storage area network.

15. The computer system of claim 14 wherein performing an unordered comparison on the first comparison tree and the second comparison tree comprises:

performing an unordered comparison on the first comparison tree and the second comparison tree to produce a first results file and a second results file, the first results file and a second results file identifying changes between the first configuration of the storage area network and the second configuration of the storage area network.

16. The computer system of claim 15 wherein the pointers added to the first comparison tree and to the second comparison tree are present in the first results file and the second results file.

17. A computer program product, including a computer-readable storage medium for comparing configurations of a storage area network at distinct points in time, comprising:

computer program code for importing a first configuration file and a second configuration file into a first configuration tree and a second configuration tree, the first configuration file representing a first configuration of a storage area network and the second configuration file representing a second configuration of the storage area network;

computer program code for processing the first configuration tree and the second configuration tree into a first comparison tree and a second comparison tree, wherein processing the first configuration tree and the second configuration tree comprises:

computer program code for converting or modifying the format of the first and second configuration trees to one that is compatible with a comparison routine that performs an unordered comparison;

computer program code for removing irrelevant information and/or inserting additional information into the first and second comparison trees; and computer program code for adding pointers to the first comparison tree and to the second comparison tree, each pointer in the first comparison tree referring back to the equivalent part of the first configuration tree and each pointer in the second comparison tree referring back to the equivalent part of the second configuration tree, wherein the pointers carry over regardless of any changes made to the format of the first and second comparison trees; and computer program code for performing the unordered comparison on the first configuration tree and the second configuration tree to produce a first results file and a second results file, the first results file and the second results file identifying changes between the first configuration of the storage area network and the second configuration of the storage area network.

18. The computer program product of claim 17 wherein computer programming code for performing the unordered comparison comprises:

computer program code for performing an unordered comparison on the first comparison tree and the second comparison tree to produce a difference file, the difference file identifying changes between the first configuration of the storage area network and the second configuration of the storage area network.

19. The computer program product of claim 18 wherein computer program code for performing an unordered comparison on the first comparison tree and the second comparison tree comprises:

computer program code for performing an unordered comparison on the first comparison tree and the second comparison tree to produce a first results file and a second results file, the first results file and a second results file identifying changes between the first configuration of the storage area network and the second configuration of the storage area network.

20. The computer program product of claim 19 wherein the pointers added to the first comparison tree and to the second comparison tree are present in the first results file and the second results file.

* * * * *